UNITED STATES PATENT OFFICE.

JOHN R. POMROY, OF BELVIDERE, ILLINOIS, ASSIGNOR OF ONE-HALF TO REUBEN J. TOUSLEY, OF SAME PLACE.

PAVEMENT.

SPECIFICATION forming part of Letters Patent No. 384,074, dated June 5, 1888.

Application filed December 17, 1887. Serial No. 258,224. (No specimens.)

*To all whom it may concern:*

Be it known that I, JOHN R. POMROY, a citizen of the United States, residing in the city of Belvidere, in the county of Boone and State of Illinois, have invented certain new and useful Improvements in Pavements, of which the following is a specification.

My improved pavement consists, essentially, of a composition of prepared coal-tar, tallow, plasterer's hair, land-plaster, and salt, prepared in a manner as follows:

In preparing the ingredients for a pavement I place a quantity of coal-tar in a suitable metallic receptacle and then ignite the tar, which is constantly stirred to eliminate all the light and dead oils contained in the tar—such as ammonia and paraffine—and the tar reduced to a state of consistency best adapted for the purpose of a pavement. When the tar is thus reduced, I add tallow in about the proportions of eight pounds to every sixteen gallons of tar, and stir to thoroughly incorporate the tallow with the tar. One-half bushel of plasterer's hair, twenty-five pounds of land-plaster, and one peck of salt are added to the tar and tallow and thoroughly mixed. In a suitable receptacle is placed a quantity of sand such as is commonly used for like purposes, and to each cubic yard of sand employed is added about sixteen gallons of the prepared tar, tallow, plasterer's hair, land-plaster, and salt, and in a heated state these ingredients are mixed to thoroughly incorporate them, which are then prepared to be applied to form the pavement. A foundation for the pavement is then prepared, preferably of broken stone or gravel, in the usual manner. The prepared mixture is then placed upon the foundation to the required thickness, which is then rolled or otherwise compressed upon the foundation, and its upper surface suitably sanded in the usual manner. The pavement thus prepared is permitted to remain undisturbed for a short time to permit the ingredients to set and form a solid mass.

The employment of hair in the pavement serves to hold the ingredients together in a mass and forms a pavement not liable to crack; also, the land-plaster and tallow act for the same purpose.

Salt is employed to harden and prevent the pavement freezing and cracking.

Flax or wool is a good substitute for the hair, and may be so employed.

In the preparation of my improved pavement in the heated season of the year it is found to be unnecessary to heat the sand, as the heated tar, hair, land-plaster, tallow, and salt can be sufficiently incorporated with the sand without additional heat.

I claim as my invention—

The herein-described composition for pavements, composed of coal-tar, sand, hair, land-plaster, salt, and tallow, substantially as set forth.

JOHN R. POMROY.

Witnesses:
E. BEHEL,
A. O. BEHEL.